United States Patent
Cooper et al.

(10) Patent No.: US 9,091,761 B2
(45) Date of Patent: Jul. 28, 2015

(54) IMAGE PROCESSING METHOD

(75) Inventors: Paul Steven Cooper, Essex (GB);
Simon Richard Potter, Guilford (GB)

(73) Assignee: MBDA UK Limited, Hertfordshire (GB)

( * ) Notice: Subject to any disclaimer, the term of this patent is extended or adjusted under 35 U.S.C. 154(b) by 245 days.

(21) Appl. No.: 13/817,335

(22) PCT Filed: Aug. 10, 2011

(86) PCT No.: PCT/GB2011/051504
§ 371 (c)(1),
(2), (4) Date: Feb. 15, 2013

(87) PCT Pub. No.: WO2012/022959
PCT Pub. Date: Feb. 23, 2012

(65) Prior Publication Data
US 2013/0141273 A1     Jun. 6, 2013

(30) Foreign Application Priority Data

Aug. 16, 2010   (GB) .................................. 1013721.4
Feb. 15, 2011    (EP) .................................. 11275028

(51) Int. Cl.
*G01S 7/292*    (2006.01)
*G01S 7/41*     (2006.01)
(Continued)

(52) U.S. Cl.
CPC .............. *G01S 13/9035* (2013.01); *G01S 7/292* (2013.01); *G01S 7/414* (2013.01); *G06T 7/0083* (2013.01); *G06T 7/0087* (2013.01); *G01S 13/90* (2013.01); *G06T 2207/10044* (2013.01)

(58) Field of Classification Search
CPC ....................................... G01S 13/90–13/9094

USPC ....... 342/25 R, 25 A, 25 B, 25 C, 25 D, 25 E, 342/25 F, 175, 179, 195–197
See application file for complete search history.

(56) References Cited

U.S. PATENT DOCUMENTS 5,326,659 A * 7/1994 Liu et al. .......................... 430/5
5,710,830 A * 1/1998 Holeva ......................... 382/173
5,768,413 A * 6/1998 Levin et al. .................... 382/173
(Continued)

FOREIGN PATENT DOCUMENTS

EP    1 832 233 A1   9/2007

OTHER PUBLICATIONS

Di Ekmann, R. et al., "A General Purpose Distributed Implementation of Simulated Annealing", Parallel and Distributed Processing, Proceedings of the Fourth IEEE Symposium, Arlington, TX (Dec. 1, 1992), pp. 94-101.*

(Continued)

*Primary Examiner* — Peter Bythrow
(74) *Attorney, Agent, or Firm* — Scully, Scott, Murphy & Presser, P.C.

(57) ABSTRACT

An image processing method using an algorithm which incorporates simulated annealing by parallel Markov chains, the calculation of fitness values of states of the Markov chains which have substantially the same simulated annealing temperature, the calculation of the standard deviation of the fitness values, and the use of this standard deviation in setting the simulated annealing cooling schedule. The method may be used to delineate an object of interest in an image against a background by estimating the boundary of the object and optimizing the fit of the region within this boundary to the region occupied by the object.

16 Claims, 1 Drawing Sheet

(51) Int. Cl.
*G01S 13/90* (2006.01)
*G06T 7/00* (2006.01)

(56) References Cited

U.S. PATENT DOCUMENTS

| | | | |
|---|---|---|---|
| 7,672,516 B2* | 3/2010 | Cremers et al. | 382/228 |
| 2006/0239557 A1* | 10/2006 | Cahill et al. | 382/181 |
| 2007/0022067 A1* | 1/2007 | Cremers et al. | 706/20 |
| 2007/0127313 A1* | 6/2007 | Segall et al. | 367/38 |
| 2009/0175557 A1* | 7/2009 | Lankoande et al. | 382/275 |
| 2011/0222370 A1* | 9/2011 | Downton et al. | 367/73 |
| 2012/0275722 A1* | 11/2012 | Yang | 382/294 |

OTHER PUBLICATIONS

Hill, R.D. et al., "Estimating building dimensions from synthetic aperture radar image sequences", IET Radar, Sonar & Navigation (Jun. 2008), vol. 2, No. 3, pp. 189-199.*

Soo-Young Lee ; Dept. Of Electr. Eng., Auburn Univ., Al, USA ; Kyung Geun Lee, "Synchronous and asynchronous parallel simulated annealing with multiple Markov chains", Parallel and Distributed Systems, IEEE Transactions on (vol. 7 , Issue: 10 ), Oct. 1996, pp. 993-1008.*

Diekmann, R. et al., "A General Purpose Distributed Implementation of Simulated Annealing", Parallel and Distributed Processing, Proceedings of the Fourth IEEE Symposium, Arlington, TX (Dec. 1, 1992), pp. 94-101.

Chesnaud, Christophe et al., "Statistical Region Snake-Based Segmentation Adapted to Different Physical Noise Models", IEEE Transactions on Pattern Analysis and Machine Intelligence (Nov. 1999),vol. 21, No. 11, pp. 1145-1157.

Lam, Jimmy et al., "An Efficient Simulated Annealing Schedule: Derivation", Technical Report 8816, Department of Computer Science, Yale University (Sep. 1986).

Yin, Zhaozheng et al., "Shape Constrained Figure-Ground Segmentation and Tracking" 2009 IEEE Conference on Computer Vision and Pattern Recognition (CVPR), pp. 731-738.

Darbon, Jerome et al., "Image Restoration with Discrete Constrained Total Variation Part II: Levelable Functions, Convex Priors and Non-Convex Cases", Journal of Mathematical Imaging and Vision, vol. 26, pp. 261-276.

Du, Xinyu et al., "A Markov Random Field Based Hybrid Algorithm with Simulated Annealing and Genetic Algorithm for Image Segmentation": Advances in natural computation, lecture notes in computer science, vol. 4221/2006, pp. 706-715.

International Search Report dated Oct. 17, 2011, issued in PCT/GB2011/051504.

Extended European Search Report dated Oct. 17, 2011 issued in European Publication No. EP 11275028.6.

UK Search Report dated Dec. 15, 2010 issued in GB1013721.4.

International Preliminary Report on Patentability and Written Opinion, dated Feb. 28, 2013 from related International Application No. PCT/GB2011/051504.

* cited by examiner

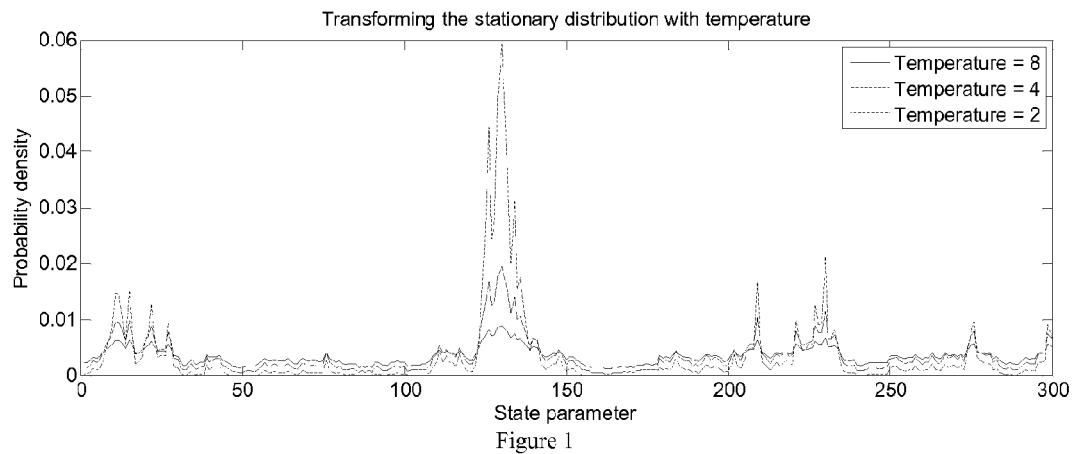
Figure 1
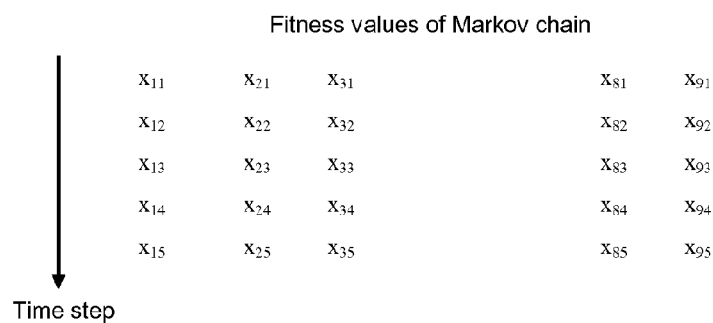
Figure 2
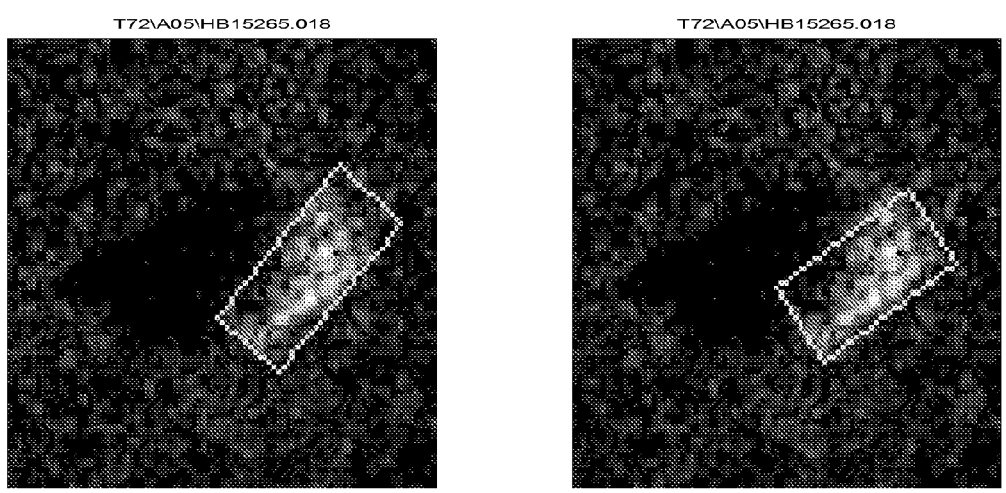
Figures 3 (left) and 4 (right)

IMAGE PROCESSING METHOD

FIELD OF THE INVENTION

This invention relates to image processing, in particular (but not exclusively) to the delineation of an object of interest in an image against a background, for example an object in a synthetic aperture radar image.

BACKGROUND OF THE INVENTION

Synthetic aperture radar (SAR) is able to provide high-resolution images of large areas under a wide range of operating conditions. The ability to recognise targets automatically in SAR images is therefore highly desirable, for both military and civil applications.

Delineation is the process of identifying the boundary between a target and the surrounding background or "clutter". This is a critical stage of the processing chain because accurate knowledge of a target's boundary allows features to be recognised which strongly discriminate between different classes of man-made targets. It is known to segment SAR imagery into target, shadow, and background clutter regions in the process of recognizing targets. However, the effects of finite resolution, speckle and self-shadowing tend to make targets' boundaries extremely difficult to detect directly.

It also is known to utilise a region-based active contour model, in which a contour that partitions the image into disjoint regions evolves to maximise the agreement between these regions and a statistical model of the image.

Measures of a contour's fitness tend to have a large number of local maxima over the space of all possible contours. This is due both to the level of noise in typical SAR images and to the complexity of targets' apparent shapes. Most of these local maxima correspond to very poor delineations. In applying active contours to SAR images the robustness of the optimisation algorithm to spurious maxima is therefore important.

Simulated annealing is a stochastic optimisation algorithm, which can be robust to the presence of local maxima. It has been proposed to use simulated annealing to optimise the placement of active contours for delineating targets.

However we have found that the use of simulated annealing in a conventional way may not delineate the target quickly enough for real-time SAR applications. The present invention, at least in its preferred embodiment, seeks to provide more rapid target delineation.

SUMMARY OF THE INVENTION

The invention provides an image processing method using an algorithm which incorporates simulated annealing by parallel Markov chains, the calculation of fitness values (as herein defined) of states of the Markov chains which have substantially the same simulated annealing temperature, the calculation of the standard deviation of those fitness values, and the use of the standard deviation in setting the simulated annealing cooling schedule.

The 'fitness value' of a contour or boundary in an image as estimated by a Markov chain state indicates the probability of that contour being correct, given the data contained in the image and the assumptions of the image model The method may comprise using the algorithm to delineate an object of interest in the image against a background by estimating a boundary of the object and optimising the fit of region contained within the estimated boundary to the region occupied by the object. Although discussed herein primarily in the context of the processing of SAR images, the method may also be used to improve processing performance in other image-processing fields involving simulated annealing by parallel Markov chains, e.g. in delineating targets in synthetic aperture sonar images, or in matching up objects in two images of the same scene ("scene matching"), or in detecting roads or other features in a topographical image.

Preferably the said Markov chain states are concurrent states. For Markov chains starting at the same simulated annealing temperature, after the same number of proposals have been made in every chain, the simulated annealing temperature will remain the same for all the chains.

The algorithm may include a Metropolis algorithm.

Preferably the parallel Markov chains start from different states. The Markov chains may exchange information and/or states, for example utilising tournament selection.

Preferably the starting temperature for the simulated annealing in is sufficient for all proposals for changes of state of the Markov chains to be accepted.

The starting temperature may be between 0.5 and 10 times (and preferably between 1 and 2 times) an estimated maximum difference in fitness value between a current Markov state and a proposed state.

The estimated maximum difference in fitness value is the difference between a fitness value when the estimated boundary is coincident with the actual boundary of the object and a fitness value when the estimated boundary encloses only background.

The simultaneous annealing may be terminated when the improvement in fitness value for all Markov chains upon a change in state is less than an estimated average difference in fitness value attributable to movement of the estimated boundary to include or exclude a single pixel of the image.

Preferably the estimated image boundary is convex. The estimated boundary may be based on an obliquely-illuminated cuboid object.

The estimated boundary may include a shadow cast by the illuminated object.

The invention also provides in further aspects, apparatus configured to operate the above method, and a computer-readable medium comprising a computer program which when installed and operated executes the method set forth above.

BRIEF DESCRIPTION OF DRAWINGS

The invention now will be described merely by way of example with reference to the following examples and the accompanying drawings, wherein:

FIG. 1 illustrates the way in which the stationary distribution of a Markov chain is transformed in the course of simulated annealing, FIG. 2 illustrates a number of Markov chains evolving in parallel, and FIGS. 3 and 4 show two delineations of a target in a SAR image.

DETAILED DESCRIPTION OF PREFERRED EMBODIMENT

The following description is in the context of the delineation of a single cuboid object in a SAR image. When delineated, the object can be identified by comparing it with a library of known target images, for example of friendly and hostile military vehicles. In developing this embodiment we used images from the US Defence Advanced Research Projects Agency's MSTAR program [reference 1].

1. Image Model

Consider an idealised scene comprising a cuboid target on a horizontal plane, and a SAR image of this scene represented by an array of $N_x \times N_y$ pixels. To simplify the geometry we assume that the angular width of the radar beam illuminating the target is small, and so the radar can be considered to lie in the same direction from the target throughout the SAR integration period.

We partition the image into three disjoint sets $\Omega_t$, $\Omega_s$ and $\Omega_c$ of target, shadow and clutter pixels respectively. $\Omega_t$ is the rectangle obtained by projecting the target orthographically on to the ground plane. $\Omega_s$ is the projection of the target from the radar on to the ground plane, excluding $\Omega_t$. $\Omega_c$ is the rest of the image. These regions are uniquely defined by the boundaries of $\Omega_t$ and $\Omega_c$, say $\partial\Omega_t$ and $\partial\Omega_c$; the contour to be optimised is $\partial\Omega_t \cup \partial\Omega_c$.

The parameterisation of an object to be optimised is a compromise between possibly conflicting requirements. Thus, the parameterisation should be able to represent all feasible configurations of the object, while making the set of feasible points in parameter space as simple as possible. It should be chosen to make the resulting fitness function easy to evaluate and smooth (e.g. some sense of continuity is desirable). In the case of a genetic algorithm, it should allow for meaningful mutation and crossover operations. Furthermore, the topology of the parameter space can also affect the optimisation algorithms that can be applied.

We characterise the scene geometrically by six parameters: length, width and height of the target cuboid, the coordinates of its centre projected on to the ground plane, and the orientation of its major axis. Designate these by L, W, H, x, y and $\theta$ respectively. The contour $\partial\Omega_t \cup \partial\Omega_c$ can be derived from these parameters by calculating the pixel coordinates of its vertices and identifying the pixels that represent straight lines drawn between them.

We assume that the intensity values s of pixels x are independent random variables distributed as follows, where $\mu_t$, $\mu_s$ and $\sigma$ are three more parameters which we assume to be known:

$$s(x)|x \in \Omega_t \sim \text{Exp}(\mu_t)$$

$$s(x)|x \in \Omega_s \sim \text{Exp}(\mu_s)$$

$$s(x)|x \in \Omega_c \sim \text{Rayleigh}(\sigma) \qquad (1)$$

The exponential target model is an empirical fit which allows targets to have both a large number of dark pixels of self-shadow as well as a large number of bright pixels. The Rayleigh distribution is a known model of homogenous clutter [reference 2] which fits the MSTAR datasets well. Although it might be expected that the shadow region would be best described by the Rayleigh distribution, in fact the exponential works better within the present model. This appears to be because the shadow boundary is not clear-cut in practice and so $\Omega_s$ tends to contain some non-shadowed clutter, which produces a long tail.

Let I be the real-valued image equal to the intensity of the complex SAR image. Then the measure of fitness that we use is the logarithm of the posterior probability of the parameter values given the image, the distributions (1), and appropriate prior distributions:

$$f(\text{parameters}) = \text{const} + \log P(\text{parameters}|I) = \text{const} + \log P(I|\text{parameters}) + \log P(\text{parameters}) \qquad (2)$$

by Bayes' theorem.

Expanding (2), assuming uniform prior distributions on feasible regions of parameter space, expressing any sum over $\Omega_c$ as a sum over the entire image minus a sum over $\Omega_u = \Omega_t \cup \Omega_s$, and disregarding constant terms, yields $$f(\text{parameters}) = \log\left(\frac{\mu_s}{\mu_t}\right)\sum_{x \in \Omega_t} 1 + \log\left(\frac{\sigma^2}{\mu_s}\right)\sum_{x \in \Omega_u} 1 + \qquad (3)$$

$$\left(\frac{1}{\mu_s} - \frac{1}{\mu_t}\right)\sum_{x \in \Omega_t} s(x) - \frac{1}{\mu_s}\sum_{x \in \Omega_u} s(x) - \sum_{x \in \Omega_u} \log(s(x)) + \frac{1}{2\sigma^2}\sum_{x \in \Omega_u} s(x)^2$$

for a feasible point in parameter space, and negative infinity otherwise.

2. Optimisation

A. Simulated Annealing

Simulated annealing is an optimisation technique based on Markov Chain Monte Carlo (MCMC) sampling. MCMC methods approximate samples from a specified distribution by setting up a Markov chain whose stationary distribution is equal to the one specified. Under rather weak conditions the chain is guaranteed to converge to its stationary distribution.

The Metropolis algorithm [reference 3] defines a Markov chain with the necessary property, as follows. Let D be the target distribution defined on the space S, and let x be a point in S. Let F(x) be the probability density function of D. Let $\pi(x)$ be a distribution such that the probability of drawing x' from $\pi(x)$ is equal to the probability of drawing x from $\pi(x')$. Then, if $x_0$ is the current state of the Markov chain, the next state is found by:

1) Proposing a new state $x_p$ by sampling from $\pi(x_0)$
2) Accepting the proposed state $x_p$ with probability $$P(\text{accept } x_p) = \begin{cases} 1 & F(x_p) \geq F(x_0) \\ \frac{F(x_p)}{F(x_0)} & \text{otherwise} \end{cases} \qquad (4)$$

The distribution of the resulting states is initially far from the target distribution, and so a large number of the resulting samples are typically discarded from the beginning of the Markov chain.

In order to optimise F over S, simulated annealing slowly transforms the target distribution in such a way that the probability mass within any neighbourhood of the global optimum (assumed to be unique) tends to one.

This is usually accomplished via the transformation $$F(x;n) \propto [F(x;1)]^{s(n)} \text{ where } s(n) \to \infty \text{ as } n \to \infty \qquad (5)$$

n is the step number, and F(x; 1)=F(x). Since the Metropolis criterion (4) depends only on the ratio of values of F, the slowly changing normalisation factor need never be calculated. The criterion is often written in the convenient form $$P(\text{accept } x_p) = \begin{cases} 1 & f(x_p) \geq f(x) \\ \exp\left(\frac{f(x_p) - f(x)}{T_n}\right) & \text{otherwise} \end{cases} \qquad (6)$$

where $f(x) = \log F(x; 1)$ and $T_n = 1/s(n)$.

By analogy with physical annealing, T is called the temperature, and $\{T_n\}$ the cooling schedule. $\pi(x)$ is called the proposal distribution.

From (6), the stationary distribution of the Markov chain is proportional to $$\exp\left(\frac{\text{fitness of state}}{\text{temperature}}\right)$$

For any fixed temperature, the Markov chain will converge to the appropriate stationary distribution. The chain is then said to be in equilibrium at that temperature. (In simulated annealing the chain never actually achieves equilibrium, because the temperature keeps changing.)

If the temperature is reduced, the stationary distribution to which the chain will converge becomes spikier. This is illustrated in FIG. 1

In simulated annealing the stationary distribution is slowly made spikier in this way. Eventually the probability of the Markov chain being in the vicinity of the state of maximum fitness becomes overwhelmingly larger than the probability of the chain being elsewhere.

If the temperature is lowered too quickly the chain will become trapped in a local maximum and will never find the global maximum. A cooling schedule can be defined to avoid this. A cooling schedule specifies how much the temperature should be reduced at each step of the chain.

B. Parallelisation

One method of parallel simulated annealing is to define multiple Markov chains which evolve in parallel, while possibly exchanging states and/or performance statistics e.g. as illustrated in FIG. 2. (Strictly, in order to maintain the Markovian property it is necessary to consider the ensemble of chains as a single, higher-dimensional chain. However, for clarity we will abuse the terminology and refer to multiple, communicating Markov chains.) Improvements in performance over a single Markov chain can arise from two distinct causes: the ability to share processing between several processors, and the intrinsically greater efficiency of several chains in exploring state space, especially when they communicate.

A set of communicating Markov chains can be seen as a population akin to that of a genetic algorithm. From this viewpoint, the algorithm given in section A appears as a specific kind of genetic mutation. However, the process of annealing deliberately breaks the detailed balance of the Markov process, albeit in a controlled manner.

C. Inventive Algorithm

The image model defined in section 1 is characterised by nine parameters: L, W, H, x, y, θ, $\mu_t$, $\mu_s$ and σ. As indicated above, we estimate the last three up front and regard them as constants in the fitness function (3).

Evaluating the fitness function (3) is the most time-consuming stage in the optimisation. The function consists of six sums over the sets of pixels $\Omega_u$ and $\Omega_r$. Such sums can be calculated quickly by the procedure given in reference [4]. This procedure, effectively a discrete Green's theorem, transforms a sum over the pixels within a region into a sum over the pixels on the boundary. It is particularly simple and fast when all the regions are convex, as is the case in (3).

Further reductions in the run-time required to obtain an acceptable delineation are achieved by "tuning" the simulated annealing through choice of the cooling schedule, stopping criterion and proposal distribution.

From (6), simulated annealing can be seen as a trade-off between hill-climbing and a random walk through parameter space, where the balance is controlled by T. It is intuitively desirable that when there are very few local optima with a fitness value comparable to the 'current' mean fitness of the Markov chain's states, the algorithm should be biased towards hill climbing, and vice-versa. When there are few local optima, too much random walking is inefficient, whereas when there are many local optima, too much hill-climbing leads to premature convergence.

The density of local optima with a given fitness is an unknown, and potentially complicated, function, whose behaviour can usually only be inferred by sampling the fitness function. However, if T(n) is a fixed a priori, any information thus gleaned during the optimisation process remains unused. Better results can often be obtained by controlling T adaptively.

Lam presented a detailed analysis of adaptive cooling of a single Markov chain [references 5, 6], which led to the schedule:

$$s_{n+1} = s_n + \frac{\lambda}{\sigma(s_n)} \frac{1}{s_n^2 \sigma^2(s_n)} \frac{4\rho_0(s_n)(1-\rho_0(s_n))^2}{(2-\rho_0(s_n))^2} \qquad (7)$$

where $s_n = 1/T_n$, $\rho_0$ is the probability of accepting a proposed move, σ is the standard deviation of the fitness values and λ is a quality parameter which regulates the rate of cooling.

σ(T) is the standard deviation of all the fitness values taken by the Markov chain once it reaches equilibrium at temperature T. This would require infinite time to measure precisely, both because the Markov chain takes infinite time to reach equilibrium, and because, on a continuous state space, it requires infinite time to visit all the infinite number of states.

Therefore Lam had to define a suitable estimator for σ. The usual estimate of the standard deviation of a sample is $$\text{Estimated standard deviation} = \sqrt{\frac{1}{N}\sum_{k=1}^{N}(x_k - \bar{x})^2} \qquad (8)$$

However, if we inserted N energy values from a single Markov chain into this formula, it would give a very poor estimate of σ. The main reason for this is that the chain would not have visited a sufficiently large number of states in N moves, and indeed all the states it had visited would be relatively close together. Their energy values would therefore also be close together, and the resulting estimate of σ would be far too small.

Lam avoided this by defining a much more sophisticated estimator for σ, which was parallelised by Chu et al [reference 7]. However, the resulting algorithm is complicated, and our proposal is much simpler.

To parallelise the algorithm, we use several Markov chains (here a fixed number, typically ten that all start in different states, independently of each other, and all evolve (non-deterministically) according to the Metropolis algorithm. The case of nine chains and five steps is shown in FIG. 2.

In this example, the (very poor) estimator of σ discussed above might use the values $x_{11}$, $x_{12}$, $x_{13}$, $x_{14}$ and $x_{15}$.

To avoid the complexities introduced by Lam and Chu et al, we calculate σ from concurrent (or substantially concurrent) fitness values selected across the Markov chains, for example $x_{15}$, $x_{25}$, $x_{35}$, ... $x_{95}$, to which we apply the simple estimator of σ given by equation (8).

We thus take a simple approach to parallelising Lam's cooling schedule, observing that, if the Markov chains do not communicate and their temperatures are synchronised, the set of single states taken from across the parallel chains at any time can be viewed as a set of uncorrelated samples from a single chain, by the ergodic property. If these states are $x_{1n}$, $x_{2n}$, ..., $x_{mn}$ then, restating (8)

$$\hat{\sigma}_n^2 = \frac{1}{m} \sum_{k=1}^{m} (x_{kn} - \bar{x}_n)^2 \qquad (9)$$

In the example, if all nine chains were completely independent of each other, the fitness values $x_{15}, x_{25}, x_{35}, \ldots x_{95}$ would also be completely independent of each other. Therefore they would be scattered over the whole range, and inserting them into the simple estimator for σ would therefore yield a reasonable estimate of σ.

However, the chains are not generally completely independent of each other because we exchange information and states between them according to a two-element tournament selection. Of course, the more frequently they exchange information, the less independent of each other they become, and the worse the simple estimate of σ may be expected to become.

We ignore this problem and use the simple estimate anyway. Surprisingly, our results indicate that the algorithm's performance is still good.

Although strongly preferable, it is not absolutely essential that the fitness values used to estimate σ be exactly contemporaneous, but they should not be too far apart in time. How far apart is acceptable depends on the instantaneous rate of cooling. Since the instantaneous rate of cooling (i.e. the cooling schedule) is what (7) seeks to determine, excessive differences in the times of the selected fitness values $x_{15}, \ldots, x_{95}$, may lead to feedback problems.

In order not to restrict the Markov chain to a subset of parameter space, annealing should begin at a temperature high enough that all proposals are accepted. From (6) it can be seen that this means $T_0$ should be a few times greater than the maximum possible difference in fitness between a state and a proposal.

We estimate this maximum difference in fitness by estimating a) the highest fitness value of any state, and b) the fitness of a typical state. Our image model does not give rise to any states which are much worse than typical, so there is no need to consider an absolute worst case. Assuming that the image model is accurate, so that the image is well described by (1), the state with the highest fitness should be that which corresponds to the truth. Equation (3) then yields $$E[\text{highest fitness value}] = N_t(k_t - \log k_t) + N_s(k_s - \log k_s) - (N_t + N_s)(1 - \gamma) \qquad (10)$$

where E is the expectation operator, $N_t = \#\Omega_t$, $N_s = \#\Omega_s$, $k_t = (\mu_t/\sigma)^2$, $k_s = (\mu_s/\sigma)^2$ and γ is Euler's constant. $N_t$ and $N_s$ are estimated at the same time as $\mu_t$, $\mu_s$ and σ. A 'typical' state may be assumed to define a rectangle well away from the true target. Taking this rectangle and the shadow to contain only clutter, we obtain $$E[\text{typical fitness value}] = \qquad (11)$$
$$-N_t(h_t - \log h_t) - N_s(h_s - \log h_s) + \frac{1}{2}(N_t + N_s)(2 + \gamma - \log \pi)$$

where $h_t = \sqrt{\frac{\pi}{2}} \sigma/\mu_t$ and $h_s = \sqrt{\frac{\pi}{2}} \sigma/\mu_s$.

We define a stopping condition similarly. Consider a target pixel which is misclassified as clutter. Changing the state so as to classify it correctly can be expected to change the fitness on average by $$E[\Delta f] = k_t - \log k_t - (1 - \gamma) \qquad (12)$$

This is the 'value' of changing the contour by a single pixel. The algorithm terminates when all chains' improvement in fitness is less than this value for three consecutive steps.

Barring some weak technical conditions, the Metropolis algorithm does not prescribe the proposal distribution. For simplicity we use a uniform distribution $$v' - v \sim U[-\delta, \delta] \qquad (13)$$

where v is any of the parameters L, W, H, x, y or θ, and v' is the proposed new value of v. As noted in reference [3] the parameter δ, which is different for each variable, must be carefully chosen; too large a perturbation and most proposals will be rejected, too small and the algorithm will be unnecessarily slow to reach new states. We adopt Lam's suggestion that the proposal distribution be adjusted to maximise the last quotient on the RHS of (7). This implies that $\rho_0 \approx 0.44$ and we scale the proposal distribution to maintain this acceptance rate via a simple feedback loop.

3. Illustrative Results

We tested the algorithm on MSTAR 'chips' of two kinds of main battle tank (MBT) and two kinds of personnel carrier, as shown in Table 1. A 'chip' is an image of a target on a bland background, for example dry grass. We use 195 chips for each target, at 15 deg depression angle.

TABLE 1

MSTAR test data

| Target type | T62 (MBT) | T72 (MBT) | BMP2 | BTR70 |
|---|---|---|---|---|
| Serial | A51 | A05 | SN 9563 | SN C71 |

Table 2 and Table 3 give the results of two baseline algorithms for comparison. They use a single Markov chain, a fixed number of steps, $N_0$, exponential cooling $T = T_0 e^{-\alpha n}$ and an adaptive/fixed proposal distribution respectively. It is not possible to apply our adaptive cooling schedule for a single chain, because (9) requires more than one chain.

Table 4 gives the results of the proposed algorithm with ten Markov chains. The results are tabulated against two parameters: λ, the cooling rate in Lam's schedule (7), and $N_I$ the number of independent steps which each chain makes before exchanging states with the others.

The performance metrics are run time and 'orientation accuracy'. This latter is the proportion of targets whose orientation is estimated to within ten degrees. We have chosen this metric because orientation is the most difficult parameter to estimate accurately; if it is given then estimating the others is relatively easy. We do not give standard deviations because the long-tailed distribution of errors makes them uninformative.

It appears that the algorithm accurately delineates around 80% of images. The remaining cases are often targets in which large sections are obscured by strong self-shadow. FIGS. 3 and 4 show two delineations for such a case.

Comparing Table 2 and Table 3 shows that the adaptive proposal distribution has had negligible effect. This is probably because we chose the initial distribution on physical grounds to give a reasonable acceptance rate. In problems where this cannot be done, adaptation would be more important.

A striking difference between Table 3 and Table 4 is the latter's consistent accuracy. Although the baseline algorithm can show good performance, it is critically dependent on the parameters. In contrast, the proposed algorithm gives similar accuracy and run times over a large region of parameter space (roughly $N^3/\lambda \le 700$).

TABLE 2

One chain, exponential cooling and fixed proposals

| | Mean run time (s) $\alpha$ | | | | Orientation accuracy (%) $\alpha$ | | | |
|---|---|---|---|---|---|---|---|---|
| $N_0$ | 0.9 | 0.99 | 0.999 | 0.9999 | 0.9 | 0.99 | 0.999 | 0.9999 |
| 10 | 0.017 | 0.017 | 0.017 | 0.017 | 9.8 | 10.8 | 13.3 | 13.1 |
| 10 | 0.133 | 0.131 | 0.131 | 0.131 | 34.6 | 13.7 | 16.7 | 17.4 |
| 10 | 1.30 | 1.29 | 1.28 | 1.27 | 52.1 | 68.5 | 30.6 | 29.5 |
| 10 | 12.8 | 13.0 | 12.6 | 13.1 | 58.2 | 72.9 | 77.7 | 58.5 |

TABLE 3

One chain, exponential cooling and adaptive proposals

| | Mean run time (s) $\alpha$ | | | | Orientation accuracy (%) $\alpha$ | | | |
|---|---|---|---|---|---|---|---|---|
| $N_0$ | 0.9 | 0.99 | 0.999 | 0.9999 | 0.9 | 0.99 | 0.999 | 0.9999 |
| $10^1$ | 0.017 | 0.017 | 0.017 | 0.016 | 11.8 | 11.5 | 11.0 | 12.8 |
| $10^2$ | 0.133 | 0.133 | 0.133 | 0.133 | 32.2 | 16.0 | 17.1 | 16.3 |
| $10^3$ | 1.28 | 1.30 | 1.29 | 1.29 | 40.5 | 70.5 | 27.2 | 30.7 |
| $10^4$ | 12.7 | 12.8 | 13.0 | 12.8 | 41.8 | 71.9 | 79.1 | 58.3 |

TABLE 4

Ten chains, adaptive cooling and adaptive proposals

| | Mean run time (s) $\lambda$ | | | | | Orientation accuracy (%) $\lambda$ | | | | |
|---|---|---|---|---|---|---|---|---|---|---|
| $N_1$ | 0.001 | 0.01 | 0.1 | 1 | 10 | 0.001 | 0.01 | 0.1 | 1 | 10 |
| 1 | 12.5 | 7.40 | 1.80 | 1.07 | 0.89 | 78.7 | 79.5 | 78.2 | 74.7 | 75.3 |
| 2 | 24.8 | 23.8 | 6.41 | 2.40 | 1.67 | 80.1 | 80.1 | 79.1 | 79.0 | 76.3 |
| 3 | 36.6 | 37.7 | 12.8 | 3.74 | 2.32 | 81.7 | 78.5 | 79.7 | 80.8 | 79.7 |
| 5 | 64.4 | 62.6 | 29.2 | 6.60 | 3.57 | 78.7 | 78.3 | 80.1 | 79.0 | 80.0 |
| 11 | | 141.8 | 85.9 | 14.3 | 6.15 | | 79.2 | 78.2 | 79.9 | 78.5 |
| 25 | | | | 36.4 | 11.8 | | | | 79.6 | 79.0 |

IV. SUMMARY

We have developed an optimisation algorithm based on parallel simulated annealing of multiple communicating Markov chains, and as a preferred embodiment have applied it to the problem of delineating targets in synthetic aperture radar images. The algorithm uses a simple but counter-intuitive parallelisation of Lam's cooling schedule on multiple Markov chains. The results show that this performs better than expected; the preferred embodiment outperformed both baseline sequential simulated annealing algorithms.

The improvement in performance is also partly due to the use of an appropriate starting temperature for the image model considered.

The improvement in performance is also partly due to the use of an appropriate stopping criterion. This criterion explicitly considers the value of continuing the optimisation.

The invention also includes any novel features or combination of features herein disclosed, whether or not specifically claimed.

V. REFERENCES

[1] see eg http://cis.jhu.edu/datasets/MSTAR
[2] Ulaby and Dobson, "Handbook of Radar Scattering Statistics for Terrain", Artech House, 1988
[3] N. Metropolis, A. W. Rosenbluth, M. N. Rosenbluth, A. H. Teller and E. Teller, "Equation of State Calculations by fast Computing Machines", The Journal of Chemical Physics vol. 21 no. 6 Jun. 1953.
[4] C. Chesnaud, P. Réfrégier and Vlady Boulet, "Statistical Region Snake-Based Segmentation Adapted to Different Physical Noise Models", IEEE transactions on pattern analysis and machine intelligence, vol. 21, no. 11, November 1999
[5] J. Lam and J. M. Delosme, "An Efficient Simulated Annealing Schedule: Derivation", Technical Report 8816, Department of Computer Science, Yale University, September 1986
[6] J. Lam and J. M. Delosme, "An Efficient Simulated Annealing Schedule: Implementation and Evaluation", Technical Report 8817, Department of Computer Science, Yale University, September 1986
[7] King-Wai Chu, Yuefan Deng and John Reinitz, "Parallel Simulated Annealing by Mixing of States", Journal of Computational Physics 148, 646-662, 1999

The invention claimed is:

1. An image processing method comprising:
receiving data representing an image;
applying simulated annealing to the data to delineate an object of interest in the received image against a background by estimating a boundary of the object and optimizing a fit of the region within this estimated boundary to the region contained within the actual boundary of the object,
said simulated annealing using parallel Markov chains, which start from different states, the simulated annealing including:
initializing each parallel Markov chain with a starting temperature, and each chain configured to accept a proposed change of state in realizing a solution;
calculating fitness values of states of the Markov chains which have the same simulated annealing temperature,
calculating the standard deviation of said fitness values, and
adapting a simulated annealing cooling schedule based on said standard deviation, and
exchanging information between the Markov chains or exchanging states between the Markov chains, or exchanging both information and states, between the Markov chains,
wherein a programmed computing device is configured to implement the receiving, implement the simulated annealing, calculate the fitness value, calculate the standard deviation, adapt the cooling schedule and the exchange of information and states.

2. The method of claim 1 wherein the said Markov chain states are concurrent states.

3. The method of claim 1 wherein the algorithm includes a Metropolis algorithm.

4. The method of claim 1 wherein the starting temperature for the simulated annealing is sufficient for all proposals for changes of state of the Markov chains to be accepted.

5. The method of claim 4 wherein the starting temperature is between 0.5 and 10 times an estimated maximum difference in a calculated fitness value between a current Markov state and a proposed state.

6. The method of claim 1 comprising terminating the simultaneous annealing when the improvement in a fitness value for all Markov chains upon a change in state is less than an estimated difference in a calculated fitness value attributable to a movement of the estimated boundary to include or exclude a single pixel of the image.

7. The method of claim 1 wherein the estimated boundary is substantially convex.

8. The method of claim 1 wherein the estimated boundary is based on an obliquely-illuminated cuboid object.

9. The method of claim 7 wherein the estimated boundary includes a shadow cast by the illuminated object.

10. The method of claim 1 wherein the image is a synthetic aperture radar image.

11. Image processing apparatus implementing a processing device configured to operate a method to
   receive data representing an image;
   apply simulated annealing to the data to delineate an object of interest in the received image against a background by estimating a boundary of the object and optimizing a fit of the region within this estimated boundary to the region contained within the actual boundary of the object, said simulated annealing using parallel Markov chains, which start from different states, the simulated annealing including:
   initialize each parallel Markov chain with a starting temperature, and each chain configured to accept a proposed change of state in realizing a solution;
   calculate fitness values of states of the Markov chains which have the same simulated annealing temperature,
   calculate the standard deviation of said fitness values, and
   adapt a simulated annealing cooling schedule based on said standard deviation, and
   exchange information between the Markov chains or exchanging states between the Markov chains, or exchanging both information and states between the Markov chains.

12. A computer program product for processing an image, said program product comprising a non-transitory computer readable medium, said medium comprising a computer program of instructions which when installed and operated on a computing device executes a method comprising
   receiving data representing an image;
   applying a simulated annealing to the data to delineate an object of interest in the received image against a background by estimating a boundary of the object and optimizing a fit of the region within this estimated boundary to the region contained within the actual boundary of the object, said simulated annealing using parallel Markov chains, which start from different states, the simulated annealing including:
   initializing each parallel Markov chain with a starting temperature, and each chain configured to accept a proposed change of state in realizing a solution;
   calculating fitness values of states of the Markov chains which have the same simulated annealing temperature,
   calculating the standard deviation of said fitness values,
   adapting a simulated annealing cooling schedule based on said standard deviation, and
   exchanging information between the Markov chains or exchanging states between the Markov chains, or exchanging both information and states between the Markov chains.

13. The method of claim 8 wherein the estimated boundary includes a shadow cast by the illuminated object.

14. The method of claim 4 wherein the starting temperature is between 1 and 2 times an estimated maximum difference in a calculated fitness value between a current Markov state and a proposed state.

15. The method of claim 14 wherein the estimated maximum difference in fitness value is the difference between a fitness value when the estimated boundary is coincident with the actual boundary of the object and a fitness value when the estimated boundary encloses only background.

16. The method of claim 1 wherein said exchange of information or states or both information and states utilizes tournament selection.

* * * * *